Jan. 14, 1930.  D. B. WAITE  1,743,412
BRAKE
Filed Jan. 16, 1928  2 Sheets-Sheet 1
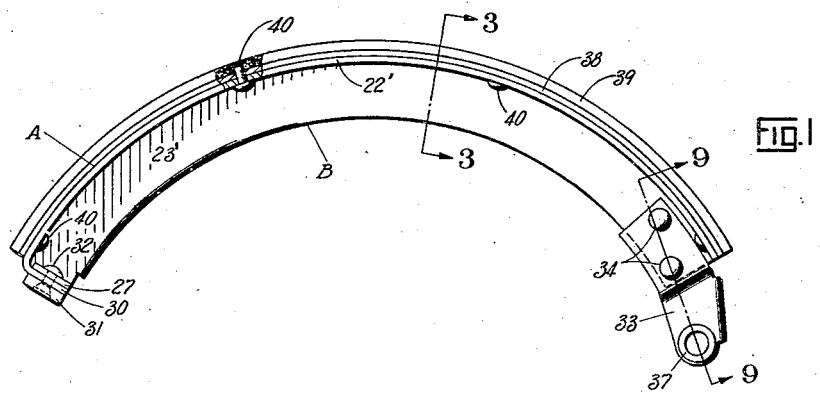
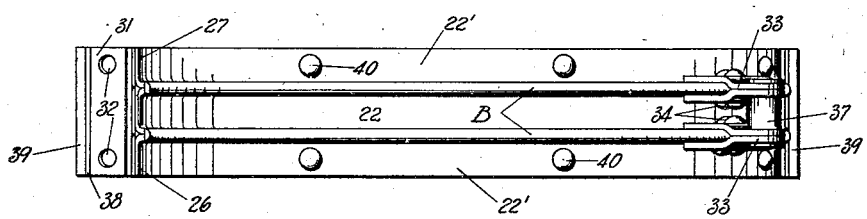
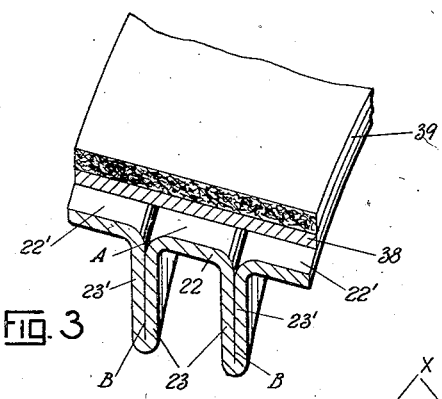
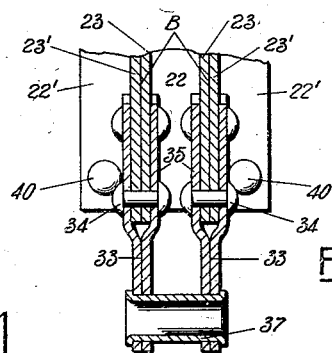
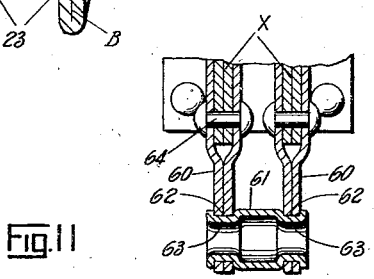
INVENTOR.
Donald B Waite
BY
P. W. Pomeroy
ATTORNEY Jan. 14, 1930.                    D. B. WAITE                    1,743,412
                                    BRAKE
                     Filed Jan. 16, 1928        2 Sheets-Sheet 2
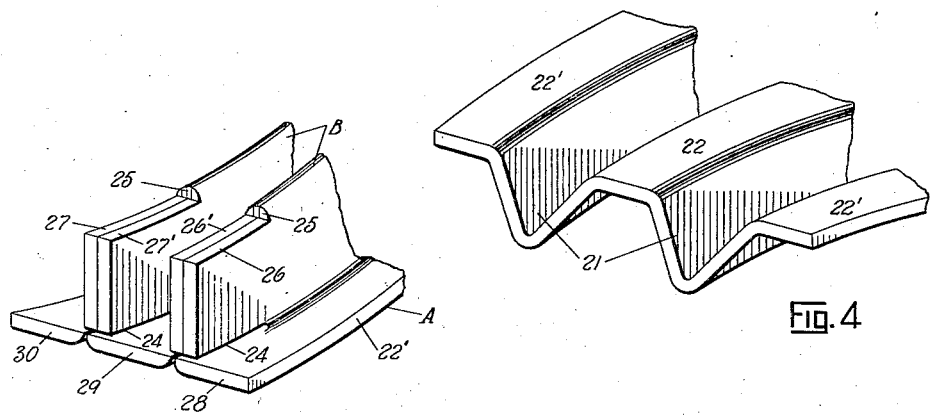
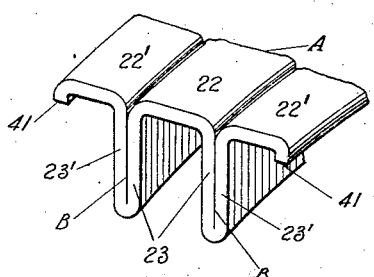
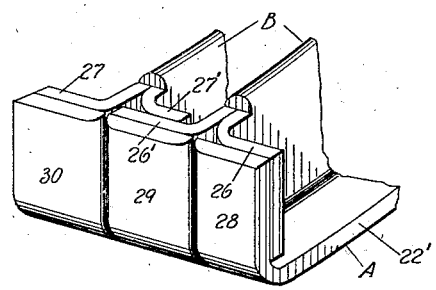
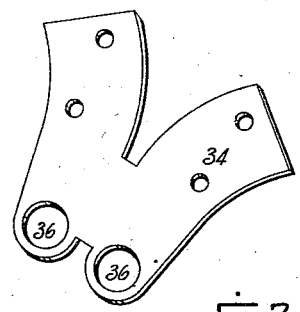
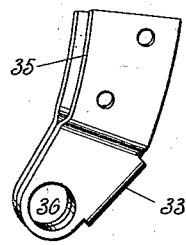
INVENTOR.
Donald B Waite
BY
P.M. Pomeroy
ATTORNEY Patented Jan. 14, 1930

1,743,412

UNITED STATES PATENT OFFICE

DONALD B. WAITE, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed January 16, 1928. Serial No. 247,214.

This invention relates to vehicle brake shoes and particularly to shoes for brakes of the internal-expanding type, the principal object being to provide a brake shoe of the internal type which is formed entirely of sheet metal so that it will be light in weight, strong in construction, and economical to manufacture.

Another object is to provide a pressed metal brake shoe formed from a single piece of sheet metal so as to present an arcuate braking surface and a pair of spaced reinforcing webs, each web being of double thickness of metal.

Another object is to provide a pressed metal brake shoe formed from a single piece of sheet metal, the metal at the sides of the central portion thereof being bent radially perpendicular thereto, and then bent back upon themselves to provide spaced reinforcing webs having their marginal edges flanged outwardly at opposite sides in the same plane as the central portion.

A further object is to provide a one-piece pressed metal brake shoe comprising an arcuate central lining supporting part having radial webs, an arcuate side lining supporting part flush with the central part having a marginal rib at one edge integral with and abutting against one of the radial webs, and a second arcuate side lining supporting part flush with the central part having a marginal rib at one edge integral with and abutting against the other of the radial webs, whereby the integral ribs and webs provide reinforcing and strengthening means for the lining supporting parts.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a side elevation of the brake shoe having a cam contact plate and anchor brackets incorporated therewith.

Figure 2 is a plan view of the brake shoe looking from the inside thereof.

Figure 3 is an enlarged fragmentary perspective taken approximately on the line 3—3 of Figure 1.

Figure 4 is an enlarged fragmentary perspective view of the brake shoe showing the same in a partially-formed condition.

Figure 5 is a fragmentary perspective view of the cam contact end of the shoe taken before the same is completely formed.

Figure 6 is a fragmentary perspective view of the cam contact end of the shoe showing the same in completely formed condition.

Figure 7 is an enlarged perspective view of the blank from which the brake shoe anchor bracket is formed.

Figure 8 is a perspective view of the completely formed anchor bracket.

Figure 9 is an enlarged section of the anchor end of the shoe taken on the line 9—9 of Figure 1.

Figure 10 is a fragmentary perspective view of a modified form of brake shoe.

Figure 11 is a partial section of a brake shoe showing a modified anchoring means.

Referring to the accompanying drawings, in which like numerals refer to like parts throughout the several views, the brake shoe illustrated is of the type particularly adapted to contact with the inner circumferential face of the drum, the same being anchored at one end to the backing plate by a pivot pin and engaged at its free end by a brake-operating cam. The brake shoe as shown in Figure 3 is provided with an arcuate brake-lining supporting portion A comprising a central arcuate part 22 and two adjacent side arcuate parts 22'. The central part 22 is flanged radially at its sides to provide webs 23 and each of the side arcuate parts 22' is provided with a radial web 23' which is integral with and abuts against the corresponding web 23 of the central part 22 to provide the stiffening members B. The integral webs 23 and 23' provide the stiffening members B which are of sufficient depth to reinforce and strengthen the brake lining-supporting portion 22 against any undue strains or stresses. To further strengthen and stiffen the shoe and prevent the spreading of the sections 22', it may also be desirable to secure the abutting webs 23 and 23' together by welding, rivets, bolts or any other suitable means.

The brake shoe proper is formed from a single piece of sheet metal by two major operations, a preliminary operation and a final forming operation. The preliminary operation consists in first blanking a sheet of metal to the desired size and then forming the same in a press or by rolling the same to the shape shown in Figure 4. This operation forms the blank to provide arcuate surfaces 22 and 22', there being a pair of longitudinal V-shaped depressions 21 extending throughout the entire length thereof. The final forming operation consists in placing the partially formed shoe in a press having dies arranged in such a manner that the arcuate portions 22 and 22' of the preliminary blank are moved transversely toward each other. This movement causes the inner walls of V-shaped depressions 21 to abut against each other to provide the reinforcing webs B, and the arcuate surfaces 22 and 22' to substantially become continuations of each other as shown in Figure 3 to provide the brake lining supporting portion A. It might be said that by forming the brake shoe in this manner, that it is provided with side arcuate lining supporting parts having radial reinforcing webs interconnected by an intermediate part flush with the side arcuate parts thereby providing reinforcing webs B having a double thickness of metal.

The preferable construction for the cam contact end of the shoe is shown in Figures 5 and 6. As shown in Figure 5, the integral connections between the radial webs B and the lining supporting portion A are notched or slotted at 24 to provide three projection strips 28, 29 and 30. That portion of the metal of each web B, which is rounded to bend back upon itself, is cut away at 25 to provide one of the webs B with extending tongues 26 and 26' and the other of the webs B with extending tongues 27 and 27' as seen in Figure 5. The tongues 26 and 26' are bent outwardly in opposite directions perpendicular to the one web B, and the tongues 27 and 27' of the other web B, are bent outwardly in opposite directions in a similar manner so that the tongue 26' overlaps and abuts against the tongue 27', whereby the outer face of the tongue 27 is flush with the outer faces of the tongues 26 and 26'. The projecting strips 28, 29 and 30 are then bent substantially perpendicular to the surface A to respectively abut against the outer faces of the tongues 26, 26' and 27, and are preferably welded thereto although they may be secured in any other suitable manner. A hardened steel plate 31 as shown in Figures 1 and 2 is suitably secured by rivets 32, bolts, or other suitable means such as welding to the projections 28 and 30 to provide a suitable brake cam bearing surface.

Anchor brackets 33 are secured to the webs B at the other end of the brake shoe. Each bracket 33 is preferably formed from a sheet metal blank 34 (shown in Figure 7), which is bent in such a manner as to provide a bifurcated end 35 which is telescopically received by the end of the web B. Rivets 34, or other suitable securing means, securely unite the bifurcated end 35 of the bracket 33 with the end of the web B. The brackets 33 are provided with aligned openings 36 which receive a transverse bushing 37 for the brake shoe anchor pin, the ends of the bushing 37 being spun over as shown in Figure 9, to hold the same in place.

If desired, an arcuate metal band 38 may be secured to the arcuate surface A of the brake shoe to reinforce the same, and the brake facing material 39 is secured to this plate and to the supporting portion A by suitable rivets 40, or other suitable securing means. It is to be understood however, that the facing material may be secured directly to the supporting portion A without the use of the band 38 if it is found desirable to omit the member 38.

In Figure 11 a modified form of constructing the anchored end of the brake shoe is shown. The anchor brackets 60 are formed in the same manner as previously described for the anchor brackets 33, but the same are not secured to the reinforcing webs X of the brake shoe until the anchor pin bushing is assembled thereto. The bushing shown in this modification comprises a tubular member 61 of greater diameter than the openings 62 having its ends swaged or reduced in diameter at 63. The openings 62 in the brackets 60 receive the swaged ends 63 of the bushing and the inner sides of the brackets 60 abut against the enlarged portion of the bushing. The ends of the swaged ends 63 of the bushing are spun over to abut against the outer sides of the brackets 60. The assembled brackets 60 and anchor pin bushing are then secured by some suitable means such as rivets 64 to the radial webs X of the brake shoe. The advantages of this anchor end construction are readily apparent. The ends of the brackets 60 are clamped between the enlarged portion 61 and the spun-over end portions of the bushing which holds the brackets 60 against movement longitudinal of the bushing. Furthermore, frictional resistance between the bushing and the anchor pin is decreased because that portion 61 of the bushing between the anchor brackets 60 does not contact with the anchor pin.

In some cases, it may be desirable to provide an even more rigid brake shoe, and this may be accomplished by forming radial flanges 41 on the marginal edges of the surface A, as shown in Figure 10. This gives rigidity to the brake shoe at its extreme side edges as well as at its central portion.

From the foregoing description, it is evident that the brake shoe of this invention can be easily formed from a single piece of sheet metal. By forming a shoe in the manner described, it is made very rigid and strong, because all of its parts are integral, and furthermore, the shoe can be manufactured very economically.

Formal changes may be made in the specific embodiment of the invention described without departing from the spirit and substance of the broad invention, the scope of which is commensurate with the appended claims.

What I claim is:

1. A brake shoe formed from a single sheet of metal comprising arcuate lining-supporting parts, radial reinforcing webs integral with said parts, and an intermediate part integrally connecting the free edges of said webs.

2. A brake shoe formed from a single sheet of metal comprising arcuate lining-supporting parts, radial reinforcing webs integral with said parts, and an intermediate part having a portion thereof flush with said lining-supporting parts integrally connecting the free edges of said webs.

3. A pressed-metal brake shoe having a generally cylindrical lining-supporting part, and a pair of spaced radial webs each comprising two radial webs integral with each other, and integral with portions of said cylindrical part.

4. A one-piece double T-section pressed-metal brake shoe having a generally cylindrical lining-supporting part, and a pair of spaced radial webs arranged between the edges of said cylindrical part, each of said webs comprising two abutting radial webs integral with each other and integral with portions of said cylindrical part.

5. A pressed-metal brake shoe comprising an intermediate lining-supporting part having its sides flanged radially and bent back upon themselves to provide a pair of spaced-reinforcing webs, the marginal edges of said webs being flanged outwardly to provide side arcuate lining-supporting parts flush with said intermediate part.

6. A pressed-metal brake shoe formed from a single sheet of metal comprising an arcuate central portion having radial webs, an arcuate side portion having a marginal web at one edge integral with and abutting against one of said radial webs, and a second arcuate side portion having a marginal web at one edge integral with and abutting against the other of said radial webs.

7. A one-piece pressed-metal brake shoe comprising an arcuate intermediate supporting part having radial webs, an arcuate side supporting part having a marginal web at one edge integral with and abutting against one of said radial webs, a second arcuate side supporting part flush with said intermediate part having a marginal web at one edge integral with and abutting against the other of said radial webs, and a lining supporting member extending across and secured to the free faces of said intermediate and side supporting parts.

8. A pressed-metal brake shoe having a generally cylindrical supporting part, a pair of spaced radial webs each comprising two radial flanges integral with each other and integral with portions of said cylindrical part, a generally cylindrical reinforcing band secured to said supporting part, and friction brake-lining secured to said band.

9. A pressed-metal brake shoe having generally cylindrical lining-supporting parts, a pair of spaced radial webs each comprising two radial flanges integral with each other and integral with portions of said cylindrical parts, and a pair of spaced pressed-metal anchor brackets secured to adjacent ends of said radial webs.

10. A pressed-metal brake shoe having a generally cylindrical lining-supporting part and a pair of spaced radial webs each comprising two radial flanges integral with each other and integral with portions of said cylindrical part, the metal comprising said lining-supporting part being bent radially at one end to abut against adjacent ends of said radial webs to provide a bearing-plate supporting surface.

11. A pressed-metal brake shoe having a generally cylindrical lining-supporting part, and a pair of spaced radial webs each comprising two radial flanges integral with each other and integral with portions of said cylindrical part, the flanges comprising said webs being bent at right angles to said webs in opposite directions to provide flush transverse surfaces, and the metal comprising said lining-supporting part being bent radially at one end to abut against said transverse surfaces to provide a cam-bearing plate supporting portion.

12. A pressed-metal brake shoe having a generally cylindrical lining-supporting part, a pair of spaced radial webs each comprising two radial flanges integral with each other, and integral with portions of said cylindrical part, the flanges comprising said webs being bent at right angles to said webs in opposite directions to provide flush transverse surfaces, and the metal comprising said lining-supporting part being bent radially at one end to abut against said transverse surfaces to provide a cam-bearing plate supporting portion, and a cam bearing plate secured to said portion.

13. A brake shoe comprising semi-circular portions having integral spaced double thickness webs forming the reinforcing means therefor, a pair of brackets secured to adjacent ends of said webs, and an anchor pin bushing extending thru said brackets, said bushing having portions abutting against the inner sides of said brackets and portions abutting against the outer sides of said brackets thereby holding said brackets in spaced relationship.

14. A brake shoe comprising semi-circular outer axial angle members, a channel-shaped intermediate member, the radial webs of said intermediate member being integral with the radial webs of said outer members and abutting against the same, pressed metal anchor brackets secured to adjacent ends of said webs, and an anchor pin bushing extending through said brackets, said bushing having an intermediate portion abutting against the inner faces of said anchor brackets and having spun-over end portions abutting against the outer faces thereof to hold said brackets in spaced relationship.

Signed by me at South Bend, Indiana this 11th day of January, 1928.

DONALD B. WAITE.